United States Patent [19]

Jaeken et al.

[11] 4,277,559
[45] Jul. 7, 1981

[54] NOVEL MAGENTA-FORMING COLOR COUPLERS AND THEIR USE IN PHOTOGRAPHY

[75] Inventors: Jan Jaeken, Hove; André Verhecken, Mortsel, both of Belgium

[73] Assignee: AGFA-Gevaert N.V., Mortsel, Belgium

[21] Appl. No.: 768,192

[22] Filed: Feb. 14, 1977

[30] Foreign Application Priority Data

Feb. 23, 1976 [GB] United Kingdom ............... 7046/76

[51] Int. Cl.$^3$ .................... G03C 1/40; G03C 7/00
[52] U.S. Cl. ................................ 430/549; 430/389; 430/555
[58] Field of Search ............ 96/100, 56.1, 56.5; 430/549, 555, 389

[56] References Cited

U.S. PATENT DOCUMENTS

| | | | |
|---|---|---|---|
| 2,983,608 | 5/1961 | Beavers | 96/56.1 |
| 3,364,022 | 1/1968 | Barr | 96/56.1 |
| 3,671,257 | 6/1972 | Otto et al. | 96/100 |
| 3,677,764 | 7/1972 | Glockner et al. | 96/100 |
| 3,703,375 | 11/1972 | Groet et al. | 96/100 |

*Primary Examiner*—Richard L. Schilling
*Attorney, Agent, or Firm*—A. W. Breiner

[57] ABSTRACT

Photographic color elements are described wherein one of the emulsion layers comprise a 4-phenylazo-2-pyrazolin-5-one coupler, the phenylazo group of which carries a p-alkoxy group of the formula:

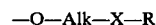

—O—Alk—X—R wherein:
Alk represents a straight-chain or branched-chain alkylene group, which may carry an aryl substituent,
X represents a linking group, and
R represents an aryl group.

5 Claims, No Drawings

NOVEL MAGENTA-FORMING COLOR COUPLERS AND THEIR USE IN PHOTOGRAPHY

The present invention relates to novel coloured 2-pyrazolin-5-one colour couplers and to photographic silver halide elements containing such colour couplers.

It is known that for the formation of a photographic colour image in a light-sensitive silver halide emulsion layer, the exposed silver halide is developed by means of an aromatic primary amino colour developer in the presence of a colour coupler, which by reaction with the oxidized developer forms a dye on the areas corresponding to the silver image.

In subtractive three-colour photography it is common practice to use a photographic element comprising at least one red-sensitized, at least one green-sensitized, and at least one blue-sensitive silver halide emulsion layer, wherein upon development in the presence of suitable colour couplers, cyan, magenta, and yellow dye images are formed respectively.

The three colour separation images usually also absorb light in undesirable regions of the spectrum, which impairs colour reproduction. Therefore, it is common practice to employ besides colourless couplers, coloured couplers for masking the undesirable side-absorptions of the dye images as described e.g. in PSA Journal, Vol. 13, 94 (1947). For example, the magenta dye image formed by means of a 2-pyrazolin-5-one coupler does not only have the desired main-absorption in the green spectral region but also an undesirable side-absorption in the blue spectral region. In order to mask this side-absorption, it is known to use yellow-coloured 2-pyrazolin-5-one couplers carrying at the 4-position an arylazogroup. These yellow couplers should not only have sufficient absorption in the blue spectral region to mask the side-absorption of the magenta dye image but also have sufficient coupling activity and they must not impair other photographic characteristics of the emulsion. The known 4-p-alkoxyarylazo-2-pyrazolin-5-ones, especially those carrying in the 3-position anilino groups, have the desired reactivity, but produce a high level of fog. It has been proposed e.g. in the British Patent Specification No. 1,269,073 to reduce the excessive fog by using together with the yellow-coloured 2-pyrazolin-5-one coupler a development-inhibitor-releasing (DIR) coupler.

In accordance with the present invention, novel 4-p-alkoxyarylazo-2-pyrazolin-5-one compounds are provided for use as yellow-coloured magenta-forming couplers that do not produce excessive fog even in the absence of DIR-couplers and that are sufficiently reactive to give the desired colour-corrective masking effects for the unwanted blue absorption of the magenta dyes.

It has been found that 4-phenylazo-2-pyrazolin-5-one couplers wherein the phenylazogroup carries in the p-position relative to the azogroup, a substituted alkoxy group as represented by the following formula I:

$$-O-Alk-X-R \qquad I.$$

wherein:
Alk represents a straight-chain or branched-chain alkylene group, which preferably comprises at most 5 C-atoms and which may carry an aryl substituent e.g. phenyl,
X represents a linking group e.g. $-O-$, $-S-$, $-CO-$, $-SO_2-$, $-SO_2O-$, $-CONQ-$, $-NQCO-$, $-SO_2NQ-$, and $-NQSO_2-$, Q being hydrogen, alkyl, or aryl, and
R represents aryl e.g. phenyl including substituted aryl, are favourable mask-forming couplers that, as compared with the corresponding couplers with unsubstituted p-alkoxyphenylazo group, produce little fog. Due to the presence of the typically substituted azo group according to the present invention, the azopyrazolinones can be isolated in a very pure form and they dissolve readily in organic water-immiscible low-boiling solvents e.g. ethyl acetate and high-boiling solvents e.g. dibutylphthalate. So, they can be incorporated into the emulsion according to well known dispersion techniques, in which such solvents are employed.

The present invention also provides a photographic colour material comprising at least one silver halide emulsion layer and a yellow-coloured 4-phenylazo-2-pyrazolin-5-one colour coupler, wherein the 4-phenylazo-2-pyrazolin-5-one colour coupler comprises in the p-position of the phenylazo group a group of the above formula I.

The 4-phenylazo-2-pyrazolin-5-one couplers according to the present invention can be represented by the following formula II:

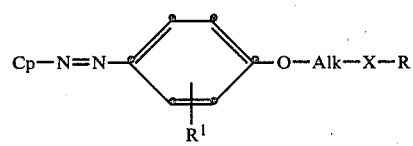

wherein:
Alk, X, and R have one of the significances given above
$R^1$ represents hydrogen, halogen, e.g. chlorine, or an electron-donating substituent e.g. alkyl, alkoxy, amino, N-alkylamino and N,N-dialkylamino, and
Cp represents a 2-pyrazolin-5-one coupler residue linked through the 4-position.

The 2-pyrazolin-5-one coupler residue Cp linked through the 4-position is derived from the usual 2-pyrazolin-5-one couplers, which can be represented by the following formula III

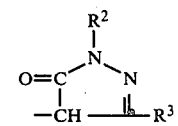

wherein each of $R^2$ and $R^3$ are substituents of the type well-known in 2-pyrazolin-5-one couplers used in silver halide colour photography:
$R^2$ can be e.g. alkyl of 1 to 20 C-atoms including substituted alkyl e.g. haloalkyl e.g. 2-trifluoroethyl, cyanoalkyl e.g. 2-cyanoethyl and benzyl including substituted benzyl, a 5- or 6-membered heterocycle, or, preferably, aryl including substituted aryl e.g. phenyl and phenyl carrying one or more substituents e.g. selected from halogen, e.g. chlorine, cyano, nitro, alkyl, alkoxy, alkylthio, alkylsulphonyl, haloalkyl, haloalkoxy, haloalkylthio, haloalkylsulphonyl, aryl, aryloxy, e.g. phenoxy, acyl, acyloxy, amino, acylamino, sulphamoyl, or carbamoyl including N-alkyl and N-aryl-substituted sulphamoyl and carbamoyl, $R^3$ can be e.g. an alkyl group of 1 to 18 C-atoms, and preferably is an amino group or substituted amino group e.g. (1) anilino including substituted anilino e.g. anilino substituted with one or more substituents selected from halogen, alkyl, sulpho, nitro, cyano, alkoxy, alkylthio, alkylsulphonyl, arylsulphonyl, aryloxysulphonyl, alkoxycarbonyl, amino including substituted amino e.g. N-alkylamino, N,N-dialkylamino and acylamino, sulphamoyl or carbamoyl including N-substituted sulphamoyl or carbamoyl; (2) acylamino e.g. alkyl and arylcarbonamido, alkoxycarbonamido, aroxycarbonamido, alkylureido, and arylureido, wherein the alkyl and aryl groups may carry further substituents e.g. alkyl, alkoxy, alkylthio, alkylsulphonyl, phenoxy, acylamino, etc.

The preferred yellow-coloured 2-pyrazolin-5-one magenta-forming couplers according to the present invention are the 1-phenyl-3-anilino-4-phenylazo-2-pyrazolin-5-ones carrying in the phenylazo group a substituent as defined above. They can be represented by the following general formula IV:

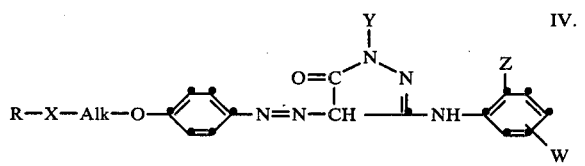

wherein:

R, X, and Alk have one of the significances given hereinbefore,

Y represents phenyl including substituted phenyl e.g. phenyl substituted with halogen e.g. chlorine and bromine, alkyl, alkoxy, alkylthio, alkylsulphonyl, aryloxy, arylthio, arylsulphonyl, cyano, nitro, sulphamoyl or carbamoyl including N-substituted sulphamoyl or carbamoyl, etc. e.g. 2-chlorophenyl, 4-chlorophenyl, 2,5-dichlorophenyl, 2,6-dichlorophenyl, 2,4,6-trichlorophenyl, 2-bromophenyl, 3,5-dibromophenyl, 2-cyanophenyl, 4-cyanophenyl, 3-nitrophenyl, 4-nitrophenyl, 4-methylphenyl, 2,6-dimethylphenyl, 2,6-diethylphenyl, 4-butylphenyl, 2-trifluoromethylphenyl, 2-chloro-5-nitrophenyl, 2-chloro-5-cyanophenyl, 5-chloro-2-methylphenyl, 2,6-dichloro-4-methylphenyl, 2,4-dichloro-6-methylphenyl, 2-chloro-4,6-dimethylphenyl, 2,6-dichloro-4-methoxyphenyl, 2,6-dichloro-4-nitrophenyl, 2,4,6-trimethylphenyl, 3-nitro-4-methylsulphonylphenyl, 4-hexadecylsulphonylphenyl, 2,6-dichloro-4-methylsulphonylphenyl, 2,6-dichloro-4-sulphamoylphenyl, 2,6-dichloro-4-N,N-dimethylsulphamoylphenyl, 4-trifluoromethylsulphonylphenyl, 2- or 4-(1,1,2-trifluoro-2-chloroethylsulphonyl)phenyl, 2-chloro-5-chloromethylsulphonylphenyl, 4-N-hexadecylsulphamoylphenyl, etc.

Z represents hydrogen, halogen, e.g. chlorine, fluorine, and bromine, alkyl e.g. methyl, alkoxy e.g. methoxy, nitro, cyano, or hydroxy, and W represents hydrogen, alkyl, alkoxy, alkylthio, alkylsulphonyl, aryl, arylthio, arylsulphonyl, aryloxysulphonyl, amino including substituted amino e.g. acylamino according to the formula $-NHCOR^4$ or $-NHCOOR^4$ wherein $R^4$ represents alkyl preferably $C_1$-$C_{18}$ alkyl including substituted alkyl or aryl including substituted aryl or carbamoyl and sulphamoyl including N-substituted sulphamoyl and carbamoyl e.g. $-SO_2NR^5R^6$ and $-CONR^5R^6$ wherein:

$R^5$ represents hydrogen, alkyl, preferably $C_1$-$C_{18}$ alkyl, or aryl e.g. phenyl including substituted aryl, and $R^6$ represents hydrogen, or alkyl, preferably $C_1$-$C_{18}$ alkyl.

The yellow-coloured magenta-forming couplers of the invention are non-diffusible.

The term "non-diffusible" as used herein has the meaning commonly applied to that term in colour photography, and denotes materials which for all practical purposes do not migrate or wander through photographic hydrophilic colloid layers, such as gelatin layers, particularly during the processing in aqueous alkaline solutions.

Preferably, the coloured couplers utilized herein are ballasted. That is, the coupler contains an organic group of such molecular size and configuration as to render the coupler non-diffusible in the element and when the element is processed in alkaline developing solutions. The organic ballasting group is chosen so that it does not exercise any detrimental effects on the photographic material. Ballasting groups are well known in the art and in the couplers of the invention they are preferably present in the 1- or 3-substituents of the 2-pyrazolin-5-one nucleus.

Representative examples of yellow-coloured magenta-forming colour couplers according to the present invention are listed in the following table:

TABLE

A.

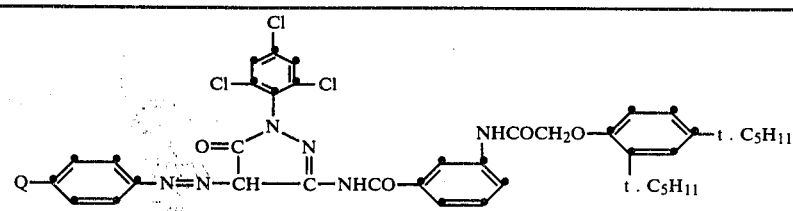

wherein: 1. Q is $-OCH_2CH_2O-C_6H_5$
2. Q is $-OCH_2CH_2SO_2-C_6H_5$

B.

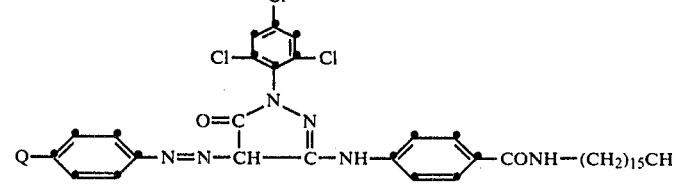

TABLE-continued
wherein:
1. Q is —OCH₂CH₂O—C₆H₅
2. Q is —OCH₂CH₂SO₂C₆H₅
C.
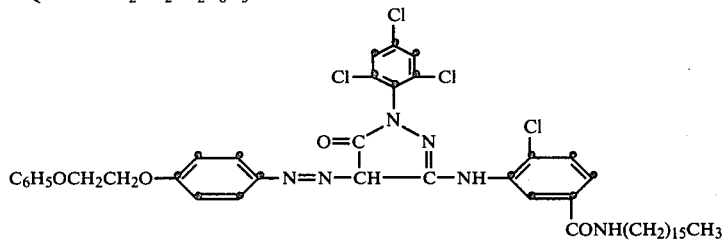
D.
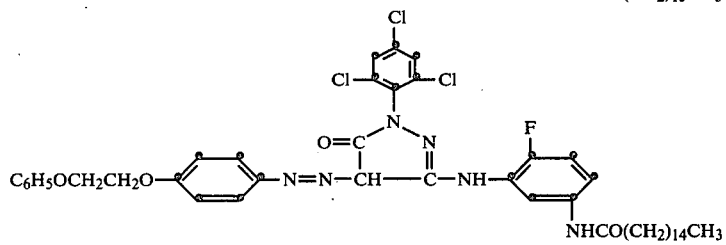
E.
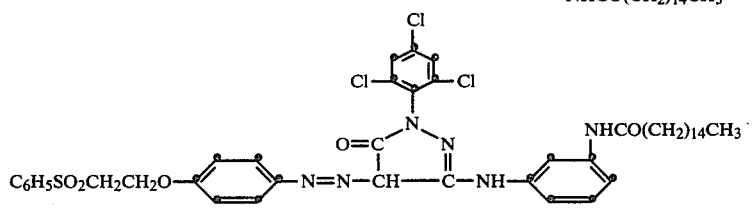
F.
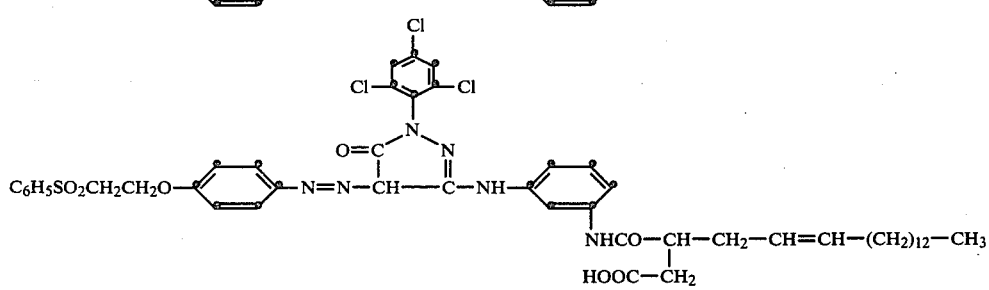
G.
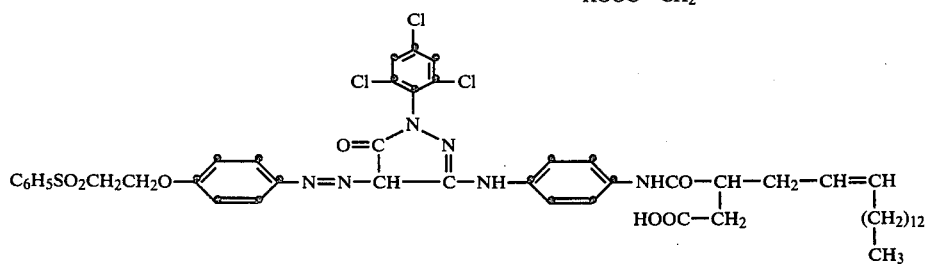
H.
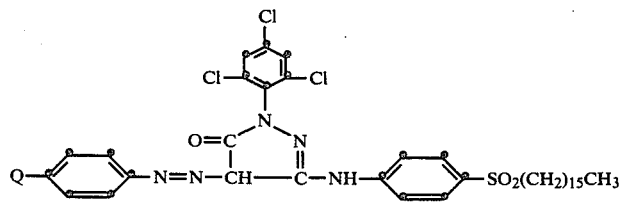
wherein:
1. Q is —OCH₂CH₂O—C₆H₅
2. Q is —OCH₂CH₂SO₂C₆H₅
3. Q is —OCH₂CONHC₆H₅
I.
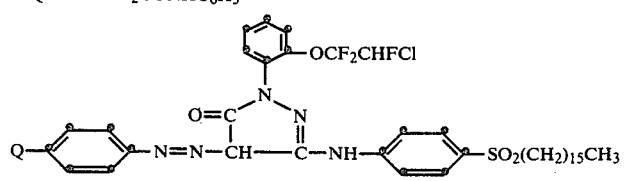
wherein: 1. Q is —OCH₂CH₂OC₆H₅

TABLE-continued

2. Q is —OCH$_2$CH$_2$SO$_2$C$_6$H$_5$
3. Q is —OCH$_2$CONHC$_6$H$_5$
4. Q is —O(CH$_2$)$_5$OC$_6$H$_5$
5. Q is —OCH$_2$CH$_2$SO$_2$OC$_6$H$_5$

6. Q is —OCH$_2$CONH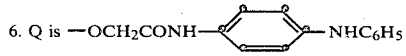NHC$_6$H$_5$

J. 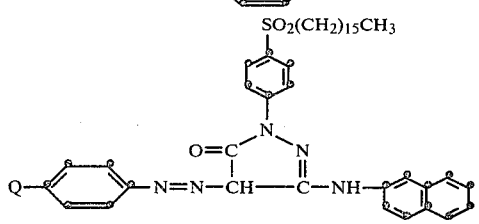

wherein: 1. Q is —OCH$_2$CH$_2$SO$_2$C$_6$H$_5$
2. Q is —OCH$_2$CH$_2$OC$_6$H$_5$ K. 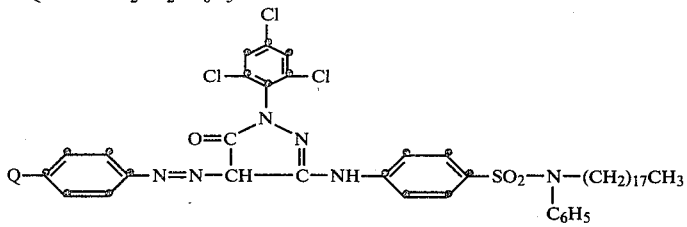

wherein: 1. Q is —OCH$_2$CH$_2$OC$_6$H$_5$
2. Q is —OCH$_2$CH$_2$SO$_2$C$_6$H$_5$ The yellow-coloured couplers of the invention can be prepared according to methods known in the art (see e.g. U.S. Pat. No. 2,983,608) by reaction of the known corresponding 4-unsubstituted 2-pyrazolin-5-one couplers with diazotised aniline derivatives carrying in the 4-position the group -O-Alk-X-R wherein Alk, X, and R are as defined hereinbefore.

The general procedure of preparation is as follows.

0.04 mol of the pyrazolone colour coupler is dissolved in 200 to 300 ml of pyridine. A diazonium solution prepared from the appropriate aniline is added dropwise between 0° and 10° C. The resulting reaction mixture is stirred for 1 h at the same temperature.

The reaction mixture is poured out in 2 liter of water. The precipitate formed is sucked off and then stirred in 5 N hydrochloric acid to neutralize and dissolve the pyridine still present. After sucking off, the product is rinsed with water until free from acid and dried in a vented drying cabinet. The product is purified by crystallization or by dissolving in a water-miscible solvent and decanting in water.

The diazonium solution is prepared by dissolving 0.048 mol of the appropriate amine in 50 to 100 ml of acetic acid, adding 10 to 20 g of ice and 14 ml of concentrated hydrochloric acid and then diazotizing at 0° with 3.9 g (0.0565 mol) of sodium nitrite in 10 to 20 ml of water. The mixture is stirred for 15 min and the surplus of nitrite is destroyed with a small amount of urea.

The couplers prepared according to the above procedure are listed in the following table.

TABLE

| Colour coupler | Yield | Melting point °C. | Purification with | Titration* theoretical | found |
|---|---|---|---|---|---|
| A1 | 23.4 g | 123° | ethanol | 1.097 | 1.047 |
| A2 | 33.5 g | ~130° | i-propanol/water | 1.04 | 1.00 |
| B1 | 29 g | ~118° | ethanol | 1.16 | 1.14 |
| B2 | 25.6 g | ~120° | i-propanol/HOAc | 1.10 | 1.10 |
| C | 34 g | 172° | methylcellosolve | 1.12 | 1.10 |
| D | 27.6 g | 170° | methylcellosolve | 1.15 | 1.15 |
| E | 34.7 g | 85° | methylcellosolve/water | 1.12 | 1.09 |
| F | 36.2 g | ~105° | ethanol/water | 2.04 | 1.97 |
| G | 37.4 g | ~115° | ethanol/water | 2.04 | 2.03 |
| H1 | 25.6 g | 145° | methylcellosolve | 1.13 | 1.10 |
| H2 | 34.6 g | 171° | methylcellosolve | 1.07 | 1.04 |
| H3 | 32.8 g | 94° | methylcellosolve/water | 1.12 | 1.09 |
| I1 | 35.6 g | 74° | ethanol | 1.10 | 1.08 |
| I2 | 36.4 g | 122° | ethanol | 1.04 | 1.04 |
| I3 | 34 g | 155° | methylcellosolve/ethanol | 1.08 | 1.08 |
| I4 | 33.6 g | 92° | methylcellosolve | 1.05 | 1.015 |
| I5 | 35 g | ~70° | methylcellosolve/water | 1.03 | 1.01 |
| I6 | 40 g | ~80° | methylcellosolve/water | 0.98 | 0.933 |
| J1 | 26.4 g | 173° | methylcellosolve | 1.14 | 1.14 |
| J2 | 25.3 g | ~94° | methylcellosolve | 1.21 | 1.21 |
| K1 | 34 g | 118° | acetic acid | 1.00 | 0.995 |
| K2 | 39.6 g | 78° | methylcellosolve/water | 0.953 | 0.921 |

*The titrations were carried out with N-hexadecyl trimethyl ammoniumhydroxide in pyridine. They are expressed in milli-equivalent per g of product.

The aniline derivatives, the diazonium salts of which are used to prepare the couplers of the invention, can be prepared as illustrated hereinafter.

4($\beta$-phenoxy ethoxy)aniline 240 g (1.25 mole) of p-tolusulphochloride were added gradually at 20° C. to 138 g (1 mole) of phenylcellosolve in 200 ml acetone. Subsequently 470 ml (4.7 moles) of 40% aqueous sodium hydroxide solution were added. The reaction mixture was stirred for 5 h at 20° C. and then decanted in 2 liters of water, sucked off, and rinsed with water. 275 g of p-tolusulphonyl-$\beta$-phenoxy ethylester melting at 82° C. were obtained.

263 g (0.9 mole) of this ester and 139 g (1 mole) of p-nitrophenol were introduced in 1280 ml of methylcellosolve. 66 g (1 mole) (content: 85%) of solid potassium hydroxide were added with stirring. The mixture was refluxed for 2 h (checking of nitrophenol by layer chromatography).

The reaction mixture was poured out in 6 liters of water. The precipitate was sucked off, stirred in 1.6 liters of N-sodium hydroxide and sucked off again, whereupon the precipitate was rinsed with water until colourless.

The p-($\beta$-phenoxy ethoxy) nitrobenzene obtained was dried and recrystallized from 1.4 liters of a mixture (1:1) of ethanol and benzine.

Yield: 211 g, melting at 88° C.

77.7 g (0.3 mole) of this nitro compound were reduced for 1 h under a hydrogen pressure of 1500 psi at 80° C. in 300 ml of methylcellosolve with Raney nickel as catalyst. The nickel was sucked off in hot condition. 4($\beta$-phenoxy ethoxy) aniline crystallized under nitrogen atmosphere during the cooling down. After sucking off and washing with ethanol 66.5 g of product melting at 108° C. were obtained. No impurities could be found by thin layer chromatography with ultraviolet or with dimethyl amino cinnamic aldehyde.

4($\beta$-phenylsulphonyl ethoxy)aniline 434 g (2 moles) of $\beta$-phenylmercapto ethylbromide and 306 g (2.2 moles) of p-nitrophenol were dissolved in 5 liters of ethanol.

A solution of 110 g (2.75 moles) of sodium hydroxide in 600 ml of water was added to the resulting solution. The whole was then refluxed for 24 h. After destillation of 3 liters of ethanol the residue was allowed to crystallize. After sucking off, stirring in a N-sodium hydroxide solution, sucking off again, rinsing with water, and drying, the product was crystallized from a mixture of ethanol and n-hexane (1:1).

Yield: 280 g, melting at 75° C.

According to a nuclear magnetic resonance examination the bands observed as well their integration correspond to the structure proposed: 4($\beta$-phenylmercapto ethoxy)nitrobenzene.

275 g (1 mole) of this mercapto compound were dissolved in 2 liters of hot acetic acid and oxidized for 75 min under reflux by the dropwise addition of 1.5 liters of 30% of hydrogen peroxide solution.

After cooling down the crystals formed were sucked off and rinsed with water until free from acid. Yield: 280 g, melting at 108° C.

The infrared spectrum complies with the structure: 4($\beta$-phenylsulphonyl ethoxy) nitrobenzene.

307 g (1 mole) of this nitro compound were reduced under a hydrogen pressure of 1500 psi at 80° C. in 1.5 liters of anhydrous ethanol with Raney nickel as catalyst.

After the addition of 2 liters of hot ethanol the nickel was sucked off in hot condition. During cooling down of the filtrate 4-($\beta$-phenylsulphonyl ethoxy) aniline crystallized, which was sucked off.

Yield: 220 g, melting point: 110° C.

Titration with perchloric acid in acetonitrile: (theoretically) 3.61 milliequivalent per gram, (found) 3.58 milliequivalent per gram.

(4-amino phenoxy)acetanilide 215.5 g (1 mole) of p-nitrophenoxy acetyl chloride were dissolved in 650 ml of dioxan. The resulting solution was added dropwise to a solution of 93 g (1 mole) of aniline in 350 ml of dioxan, in which 84 g (1 mole) of sodium hydrogen carbonate had been suspended. The mixture was stirred for 2 h whereupon the reaction mixture was poured out in 5 liters of water. It was then acidified with hydrochloric acid. The precipitate was sucked off, washed with water until free from acid, crystallized from 500 ml of acetic acid, and washed again with N-hexane. Yield: 250 g, melting point 173° C.

According to the mass spectrographical examination the resulting product corresponds with (4-nitrophenoxy)acetanilide.

272 g (1 mole) of this nitro compound were reduced under a hydrogen pressure of 1500 psi at 70° C. in 1.5 liters of anhydrous ethanol with Raney nickel as catalyst. After sucking off of the catalyst the mixture was poured out in 10 liters of water and sucked down.

Yield: 222 g of (4-aminophenoxy)acetanilide. Melting point: 105° C.

Titration with perchloric acid in acetonitrile: (theoretical) 4.13 milliequivalent per gram; (found) 4.12 milliequivalent per gram.

4($\beta$-phenoxypentyloxy)aniline 122 g (0.5 mole) of $\beta$-phenoxy pentylbromide and 77 g (0.55 mole) of p-nitrophenol were refluxed in 1300 ml of ethanol. A solution of 22 g (0.55 mole) of sodium hydroxide in 150 ml of water was added. The resulting mixture was refluxed for 26 h more. After cooling down the precipitate was sucked off and rinsed with water. Yield: 108 g of 4($\beta$-phenoxypentyloxy)nitrobenzene melting at 73° C. During a chromatographical examination with UV no impurities could be observed.

301 g (1 mole) of this nitro compound were reduced under a hydrogen pressure of 1500 psi at 70° C. in 1.5 liters of anhydrous ethanol with Raney nickel as catalyst. After sucking off of the catalyst and addition of 500 ml of water to the filtrate, 250 g of white crystals of 4($\beta$-phenoxypentyloxy) aniline having a melting point lower than 50° were formed during cooling down. A thin layer chromatographical examination did not proove the existence of any impurities.

Benzene sulphonyl($\beta$-4-aminophenoxyethyl)ester 92 g (0.5 mole) of p-nitrophenoxy ethanol were dissolved with stirring and cooling in 400 ml of pyridine. At 5° C. 96 g (0.55 mole) of benzene sulphochloride were added. After a stirring period of 2 h a precipitate was formed by the addition of 400 g of water. The precipitate was sucked off, rinsed with water, dried, and crystallized from 800 ml of ethanol. Yield: 131 g. Melting point: 90° C.

A nuclear magnetic resonance examination confirmed the structure of benzene sulphonyl ($\beta$-4-nitrophenoxyethyl)ester.

323 g (1 mole) of this nitro compound were reduced under a nitrogen pressure of 1500 psi at 45° C. in 3.5 liters of anhydrous ethanol with Raney nickel as catalyst. After the addition of 1500 ml of hot methylcellosolve the catalyst was filtered off. By the addition of water the amine crystallized 251 g of benzenesulphonyl ($\beta$-4-aminophenoxyethyl)ester, melting at 115° C.

During a thin layer chromatographic examination with UV two very week stains could be observed.

4(4'-aminophenoxy)acetamido diphenylamine 184 g (1 mole) of p-aminodiphenylamine and 84 g (1 mole) of sodium hydrogen carbonate were stirred in 1 liter of dioxan. A solution of 215 g (1 mole) of p-nitrophenoxy acetylchloride in 700 ml of dioxan were added dropwise. The temperature was kept below 40° by cooling.

After 1 h the mixture was poured in 10 liters of ice water. The precipitate was sucked off, rinsed with water, and dried.

After recrystallization from a mixture of 1500 ml of ethanol and 2500 ml of methylcellosolve, 250 g of 4(4'-nitrophenoxy)acetamido diphenylamine melting at 191° were obtained. The molecular weight determined by mass spectrometry corresponded with that of the intended structure. A thin layer chromatographical examination did not proove any impurities.

363 g (1 mole) of this nitro compound were reduced under a hydrogen pressure of 1500 psi at 70° C. in 2250 ml of methylcellosolve with Raney nickel as catalyst. The catalyst was filtered off in hot condition and the filtrate was poured out in 6 liters of ice water. The precipitate was sucked off, rinsed with water, and dried. 318 g of 4(4'-aminophenoxy) acetamido diphenylamine melting at 161° C.

A thin layer chromatographical examination with UV showed but one very weak stain.

The colour couplers of the present invention can be incorporated into a hydrophilic colloid layer e.g. a silver halide emulsion layer of a photographic element according to any of the methods known in the art. The colour couplers of the invention are preferably incorporated into photographic hydrophilic colloid media from solutions in high-boiling sparingly water-miscible solvents such as di-n-butyl phthalate and tricresyl phosphate or in low-boiling sparingly water-miscible solvents such as ethyl acetate, methylene chloride, diethyl carbonate, chloroform, etc. or mixtures thereof, because they have a high solubility therein and since very fine dispersions can be obtained by means of these solvents.

For this purpose these solutions can be dispersed in extremely fine droplets, preferably in the presence of one or more wetting or dispersing agents into a hydrophilic colloid medium e.g. aqueous gelatin, or into water, the low-boiling sparingly water-miscible solvent then being removed by evaporation. The stable dispersions of the colour couplers can be stored as such and then admixed whenever desired with the coating composition itself of the hydrophilic colloid layer such as a silver halide emulsion layer, into which the compounds are intended to be present.

The colour couplers can also be dissolved in water-miscible organic solvents e.g. dimethylformamide, dimethylsulphoxide, N-methylpyrrolidone, tetrahydrofuran, etc. and the solution can be dispersed directly in the coating composition or first in a hydrophilic colloid medium, which is then mixed with the coating composition.

The water-miscible solvent can be removed from the coating composition or the hydrophilic colloid medium or it can remain therein.

It is also possible to use a mixture of water-immiscible and water-miscible solvents, low-boiling water-immiscible solvents being removed from the medium, preferably before the coating.

In the above methods for incorporating the colour couplers into the coating compositions to form one or more of the hydrophilic colloid layers of a photographic element, it is common practice to employ one or more surface-active compounds as dispersing agents, which include anionic, non-ionic, and amphoteric surfactants e.g. sodium isotetradecyl sulphate, sodium dioctyl sulphosuccinate, sodium alkylbenzene sulphonates, sodium alkyl naphthalene sulphonates, sorbitan monolaurate, etc.

More details about particularly suitable techniques that can be employed for incorporating the colour couplers of the invention into a hydrophilic colloid layer of a photographic material there can be referred to e.g. U.S. Pat. Nos. 2,269,158, 2,284,887, 2,304,939, 2,304,940 and 2,322,027, United Kingdom Patent Specifications 791,219, 1,098,594, 1,099,414, 1,099,415, 1,099,416, 1,099,417, 1,218,190, 1,272,561, 1,297,947, 1,346,425, and 1,346,426, French Patent specification No. 1,555,663, Belgian Patent Specification Nos. 722,026 and 812,173, German Patent specification No. 1,127,714.

The yellow-coloured magenta-forming colour couplers can be used in any photographic emulsion where magenta-forming couplers are used or can be used. Generally these couplers are used in admixture with uncoloured magenta-forming couplers. Coloured and uncoloured couplers are selected, which form either the same magenta dye upon colour development or a magenta dye of the same hue. In addition to being used in combination with uncoloured magenta-forming couplers, the yellow-coloured magenta-forming couplers can be used in combination with development-inhibitor-releasing (DIR) couplers as described e.g. in British Patent Specification 1,269,073. DIR-couplers improve the sharpness and promote desirable interimage effects as is well known in the art.

The photographic element comprising a yellow-coloured magenta-forming coupler according to the present invention may also comprise in the emulsion layer or in intermediate or surface layers competing couplers e.g. 2-pyrazolin-5-one couplers comprising a methyl substituent in the 4-position. Suitable competing couplers have been described in the British Patent Specification Nos. 861,138 and 914,145 and in the published German Patent Applications 1,909,067 and 2,304,319.

The colour couplers according to the invention may be used in conjunction with various kinds of photographic emulsions. Various silver salts may be used as the sensitive salt such as silver bromide, silver iodide, silver chloride or mixed silver halides such as silver chlorobromide, silver bromoiodide, silver chloroiodide and silver chlorobromoiodide. The couplers can be used in emulsions of the mixed packet type as described in U.S. Pat. No. 2,698,794 or emulsions of the mixed grain type as described in U.S. Pat. No. 2,592,243. The colour couplers can be used with emulsions, in which latent images are formed predominantly at the surface of the silver halide crystal, or with emulsions in which latent images are formed predominantly inside the silver halide crystal.

The hydrophilic colloid used as the vehicle for the silver halide may be e.g. gelatin, colloidal albumin, zein, casein, agar-agar, alginic acid and derivatives thereof, a cellulose derivative, e.g. carboxymethylcellulose and hydroxyethylcellulose, a synthetic hydrophilic colloid such as polyvinylalcohol, poly-N-vinyl pyrrolidone, copolymers of acrylic acid, polyacrylamides and derivatives, etc. If desired, compatible mixtures of two or more of these colloids can be employed for dispersing the silver halide.

The light-sensitive silver halide emulsions of use in the preparation of a photographic material according to the present invention can be sensitized chemically as well as optically. They can be chemically sensitized by effecting the ripening in the presence of small amounts of sulphur-containing compounds such as allyl thiocyanate, allyl thiourea, sodium thiosulphate, etc. The emulsions can also be sensitized by means of reductors e.g. tin compounds as described in French Patent Specification No. 1,146,955 and in Belgian Patent Specification No. 568,687, imino-amine methane sulphinic acid compounds as described in United Kingdom Patent Specification No. 789,823 and small amounts of noble metal compounds such as gold, platinum, palladium, iridium, ruthenium and rhodium compounds. They can be sensitized optically by means of cyanine and merocyanine dyes.

The said emulsions can also comprise compounds, which sensitize the emulsions by development acceleration e.g. compounds of the polyoxyalkylene type such as alkylene oxide condensation products as described i.a. in U.S. Pat. Nos. 2,531,832, 2,533,990, 3,210,191, and 3,158,484, in United Kingdom Patent Specification Nos. 920,637 and 991,608 and in Belgian Patent Specification No. 648,710, onium derivatives of amine-oxides as described in United Kingdom patent Specification No. 1,121,696, compounds of the type described in U.S. Pat. Nos. 3,523,796, 3,523,797, 3,552,968, 3,746,545, and 3,749,574, organic thioethers e.g. the polymeric thioethers of British Patent Applications 56630/72, 2865/75, 2866/75, and 2867/75 and of U.S. Pat. Nos. 3,046,129, 3,046,132, 3,046,133, 3,046,134, 3,046,135, and 3,201,242, in British Patent Specification Nos. 931,018 and 1,249,248, and in French Patent Specification No. 1,351,410.

Further, the emulsions can comprise stabilizers and anti-foggants e.g. heterocyclic nitrogen-containing thioxo compounds such as benzothiazoline-2-thione and 1-phenyl-2-tetrazoline-5-thione and compounds of the hydroxytriazolopyrimidine type. They can also be stabilized or protected against fogging by means of mercury compounds such as the mercury compounds described in Belgian Patent Specification Nos. 524,121, 677,337, and 707,386, and in U.S. Pat. No. 3,179,520, with organic disulphides e.g. those described in U.S. Pat. No. 3,761,297 and nitrobenzene compounds as described in Belgian Patent Specification No. 788,687.

The light-sensitive emulsions can also comprise any other ingredients such as plasticizers, wetting agents, and hardening agents e.g. formaldehyde, mucobromic and mucochloric acid, diketones, dialdehydes, methane sulphonic acid esters, triazine derivatives, carbodiimide compounds, etc., U.V. absorbers e.g. 2-(2'-hydroxyphenyl)benzotriazole, antioxidizing agents e.g. 6-hydrochromane, etc.

The non-diffusing yellow-coloured magenta-forming couplers described in the present invention can be used in monochromatic photographic elements. However, they are usually incorporated into a green-sensitized silver halide emulsion for forming one of the differently sensitized silver halide emulsion layers of a photographic multilayer colour material. Such photographic multilayer colour material usually comprises a support, a red-sensitized silver halide emulsion layer with one or more cyan-forming couplers e.g. of the phenol or α-naphthol type, a green-sensitized silver halide emulsion layer with one or more magenta-forming couplers e.g. of the 2-pyrazolin-5-one or indazolone type and a blue-sensitive silver halide emulsion layer with one or more yellow-forming couplers e.g. of the acylacetamide-type. Each of the red-sensitized, green-sensitized, and blue-sensitive silver halide emulsion layers may consist of a single stratum or of two or more strata, which may have different sensitivity. Each such stratum of green-sensitized emulsion may contain a coloured coupler of the invention in same or varying concentrations, but it is also possible that one or more of the strata does not contain such coloured coupler.

In addition to the emulsion layers, the photographic multilayer colour element usually also comprises an antihalation layer, a yellow filter layer, and other intermediate layers, and protective surface coatings.

The emulsions can be coated on a wide variety of photographic emulsion supports. Typical supports include cellulose ester film, polyvinylacetal film, polystyrene film, polyethylene terephthalate film and related film or resinous materials, as well as glass.

For the production of photographic colour images according to the present invention an exposed silver halide emulsion layer is developed with an aromatic primary amino developing substance in the presence of a colour coupler according to the present invention. All colour developing agents capable of forming azomethine dyes can be utilised as developer. Suitable developing agents are aromatic compounds such as p-phenylene diamine and derivatives e.g. N,N-diethyl-p-phenylene diamine, N-butyl-N-sulphobutyl-p-phenylene diamine, N,N-diethyl-N'-sulphomethyl-p-phenylene diamine, N,N-diethyl-N'-carboxymethyl-p-phenylene diamine, 2-amino-5-diethylaminotoluene, 4-amino-N-ethyl-N($\beta$-methanesulphonamidoethyl)-m-toluidine, N-hydroxyethyl-N-ethyl-p-phenylene diamine, etc. The photographic developing compositions may comprise in addition to the usual ingredients development-accelerating onium, polyoxyalkylene, and thioether compounds as referred to hereinbefore, as well as antifogging agents e.g. nitrobenzene compounds of the type described in the Belgian Patent Specification No. 788,687.

The following example illustrates that better fog values are obtained with the yellow-coloured magenta-forming couplers of the invention that with the corresponding couplers, in which the 4-phenylazo group carries an unsubstituted p-alkoxy substituent.

EXAMPLE 7 mmoles of the azo coupler was dissolved at 75° C. in 18 to 30 ml of ethylacetate together with 6 g of dibutylphthalate.

The solution of the azo coupler was added at 40° C. with stirring by means of a dispersing apparatus to 61.5 g of a 10% aqueous gelatin solution and 6.1 ml of a 10% solution of an emulsifying agent. The ethylacetate was distilled quickly in vacuo. The residual dispersion was diluted with water to 163 g.

183 g of a silver bromide iodide emulsion was stirred at 40° C. The above dispersion of azo coupler was added to the emulsion whereupon the common emulsion ingredients such as a stabilizing agent, a hardening agent and a wetting agent were added.

The final weight was adjusted with water to 650 g whereas the pH value was adjusted to 6.0–6.2.

The emulsion was applied to film support and dried. The light-sensitive material obtained was exposed, and developed for 15 min with the following composition:

| | |
|---|---|
| 2-amino-5 (N-ethyl-N-β-methylsulphonamido ethyl amino) toluene | 5 g |
| benzyl alcohol | 3.8 ml |
| sodium hexametaphosphate | 2 g |
| anhydrous sodium sulphite | 2 g |
| 10% aqueous solution of sodium hydroxide | 5.5 ml |
| sodium carbonate monohydrate | 50 g |
| potassium bromide | 0.86 g |
| water to make | 1 liter |
| | (pH = 10.75 ± 0.05) |

The developed material was then fixed for 5 min in the following composition:

| | |
|---|---|
| water | 800 ml |
| anhydrous sodium thiosulphate | 200 g |
| potassium metabisulphite | 12 g |
| acetic acid | 12 ml |
| borax | 20 g |
| potash alum | 15 g |
| water to make | 1 liter |
| | (pH: 4 ± 0.2) |

The material was then rinsed with water for 10 min and subsequently bleached for 7 min with the following bleaching composition:

| | |
|---|---|
| water | 750 ml |
| sodium hexametaphosphate | 6 g |
| potassium hexacyanoferrate(III) | 42 g |
| potassium bromide | 12 g |
| disodium phosphate 12 H₂O | 6.5 g |
| monopotassium phosphate | 16 g |
| water to make | 1 liter |
| | (pH: 6.05 ± 0.05) |

The material was then rinsed for 8 min with water, fixed for 5 min and rinsed again for 10 min.

The magenta fog of the developed strips was measured through a green filter and compared with the fog value of the corresponding compound with a p-methoxy phenylazo substituent (comparison material).

| Coupler | para-substituent of phenylazo group | fog |
|---|---|---|
| comparison material | —OCH$_3$ | 0.18 |
| A1 | —OCH$_2$CH$_2$O—C$_6$H$_5$ | 0.14 |
| A2 | —OCH$_2$CH$_2$—SO$_2$—C$_6$H$_5$ | 0.11 |
| comparison material | —OCH$_3$ | 0.50 |
| B1 | —OCH$_2$CH$_2$O—C$_6$H$_5$ | 0.23 |
| B2 | —OCH$_2$CH$_2$—SO$_2$—C$_6$H$_5$ | 0.23 |
| comparison material | —OCH$_3$ | 0.50 |
| E | —OCH$_2$CH$_2$—SO$_2$—C$_6$H$_5$ | 0.21 |
| comparison material | —OCH$_3$ | 0.98 |
| F | —OCH$_2$CH$_2$—SO$_2$—C$_6$H$_5$ | 0.28 |
| comparison material | —OCH$_3$ | 0.65 |
| G | —OCH$_2$CH$_2$SO$_2$—C$_6$H$_5$ | 0.29 |
| comparison material | —OCH$_3$ | 0.76 |
| H1 | —OCH$_2$CH$_2$O—C$_6$H$_5$ | 0.23 |
| H2 | —OCH$_2$CH$_2$—SO$_2$—C$_6$H$_5$ | 0.28 |
| H3 | —OCH$_2$CONH—C$_6$H$_5$ | 0.28 |
| comparison material | —OCH$_3$ | 0.47 |
| I1 | —OCH$_2$CH$_2$—O—C$_6$H$_5$ | 0.23 |
| I2 | —OCH$_2$CH$_2$—SO$_2$—C$_6$H$_5$ | 0.27 |
| I3 | —OCH$_2$CONH—C$_6$H$_5$ | 0.24 |
| I4 | —O—(CH$_2$)$_5$—O—C$_6$H$_5$ | 0.24 |
| I5 | —O—CH$_2$CH$_2$—SO$_2$—O—C$_6$H$_5$ | 0.19 |
| I6 | —O—CH$_2$CONH—C$_6$H$_4$—NH—C$_6$H$_5$ | 0.18 |

One could assume that the high fog that is inherent to the p-methoxy substituted compound is due to the presence of impurities. Therefore, in the following tests the methoxysubstituted compound was purified by preparative chromatography. No reduction in the high fog value could be observed.

| Azo coupler | p-substituent in phenylazo group | fog |
|---|---|---|
| comparison material | —OCH$_3$ | 0.47 |
| J1 | —OCH$_2$CH$_2$—SO$_2$—C$_6$H$_5$ | 0.31 |
| J2 | —OCH$_2$CH$_2$—O—C$_6$H$_5$ | 0.26 |
| comparison material | —OCH$_3$ | 0.32 |
| K1 | —OCH$_2$CH$_2$O—C$_6$H$_5$ | 0.24 |
| K2 | —OCH$_2$CH$_2$—SO$_2$—C$_6$H$_5$ | 0.25 |

We claim:

1. A photographic color element comprising a support and at least one silver halide emulsion layer comprising a colored 4-phenylazo-2-pyrazolin-5-one color coupler wherein the 4-phenylazo group of the coupler carries in the p-position relative to the azo group, a substituted alkoxy group of the formula:

—O—Alk—X—R wherein:
Alk represents a straight-chain or branched-chain alkylene group, which may carry an aryl substituent,
X represents a member of the group consisting of O, S, CO, SO$_2$, SO$_2$O, CONQ, NQCO, SO$_2$NQ, and NQSO$_2$, Q being hydrogen, alkyl or aryl, and
R represents an aryl group.

2. A photographic element according to claim 1, wherein the 4-phenylazo-2-pyrazolin-5-one colour coupler corresponds to the formula:

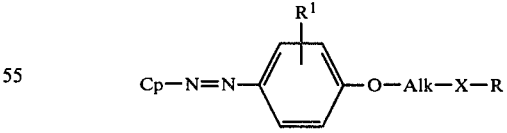

wherein:
Alk represents a straight-chain or branched-chain alkylene group, which may carry an aryl substituent,
X represents a member of the group consisting of O, S, CO, SO$_2$, SO$_2$O, CONQ, NQCO, SO$_2$NQ, and NQSO$_2$, Q being hydrogen, alkyl or aryl,
R represents an aryl group,
R$^1$ represents hydrogen, halogen, or an electron-donating substituent, and Cp represents a 2-pyrazolin-5-one residue linked through the 4-position.

3. A photographic colour element according to claim 2, wherein the residue Cp stands for the group:

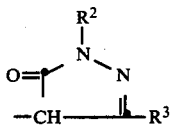

wherein:

$R^2$ represents an alkyl group, an aryl group or a 5- or 6-membered heterocycle, and $R^3$ represents an alkyl group, an acylamino group or an anilino group.

4. A photographic element according to claim 3, wherein the colour coupler corresponds to the following formula:

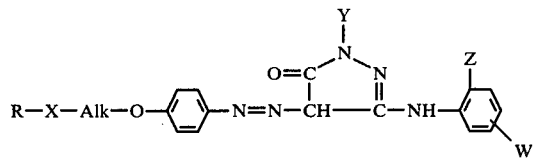

wherein:
Alk represents a straight-chain or branched-chain alkylene group, which may carry an aryl substituent, X represents a member of the group consisting of O, S, CO, $SO_2$, $SO_2O$, CONQ, NQCO, $SO_2NQ$, and $NQSO_2$, Q being hydrogen, alkyl or aryl, R represents an aryl group, Y represents a phenyl group, Z represents hydrogen, alkyl, alkoxy, halogen, nitro, cyano or hydroxy, and W represents hydrogen, alkyl, alkoxy, alkylthio, alkylsulphonyl, aryl, aryloxy, arylsulphonyl, aryloxysulphonyl, a carbamoyl group, a sulphamoyl group.

5. A photographic color element according to claim 1, wherein the emulsion layer comprises in addition to the 4-phenylazo-2-pyrazolin-5-one color coupler, a colorless 2-pyrazolin-5-one color coupler.

* * * * *